Jan. 15, 1963  E. C. RITTER  3,073,627
BRANCHED PIPE JOINT HAVING A TUBE CONNECTING PLUG
Filed Nov. 13, 1956  2 Sheets-Sheet 1

INVENTOR.
Emil C. Ritter
BY
ATTORNEY

Jan. 15, 1963      E. C. RITTER      3,073,627

BRANCHED PIPE JOINT HAVING A TUBE CONNECTING PLUG

Filed Nov. 13, 1956      2 Sheets-Sheet 2

INVENTOR.
Emil C. Ritter

BY *Irving Seidman*

ATTORNEY

United States Patent Office 3,073,627
Patented Jan. 15, 1963

3,073,627
BRANCHED PIPE JOINT HAVING A TUBE
CONNECTING PLUG
Emil C. Ritter, 3750 Hudson Manor Terrace,
New York, N.Y.
Filed Nov. 13, 1956, Ser. No. 621,660
13 Claims. (Cl. 285—222)

This invention relates to means for joining angularly related tubes used as structural components after plating or finishing of the component parts so that the assemblies can be accomplished at once without any visible marring or defacement of the finished product and, more particularly, to a novel solid or hollow tube expanding connecting plug.

Tubes or tubing lengths used as structural components for lightweight high strength structures have hitherto been joined in a number of manners, as by the use of mechanical connecting elements, or by welding, brazing, or soldering. Another known method is to insert a plug through a hole in one tube, this plug having a portion of varying cross-sectional area. A second tube is then inserted through the hole in telescoped relation with the plug. As the second tube is forced inwardly, its end within the tube is expanded by the plug.

This forms a joint in which the end of one tube is locked within the other tube by virtue of being expanded therein. However, such a joint is not mechanically tight and the tubes are not held in pre-set angular relation but may be easily moved angularly relative to each other. Eventually the connection becomes loosened to an extent permitting separation of the two tubes and impairment of the usefulness of the product so joined together.

In accordance with the present invention, a tube joint of this plug expanding type is greatly improved, and the tubes are held permanently in fixed angular relation, by providing a solid or hollow plug having an inner end insertable through a wall opening in a relatively larger diameter tube and constructed and arranged to be anchored to the wall of such tube, opposite the opening, to extend concentrically through the opening. The inner end of the plug has lateral dimensions substantially equal to those of the opening, this inner end being shaped for surface to surface engagement with the inner surface of such larger diameter tube. The outer end of the plug has lateral dimensions and contour such as to have a telescoping fit in a smaller diameter tube whose outer lateral dimensions and contour correspond closely to the dimension and contours of the wall opening.

Outwardly of such inner end, the plug is formed with a transition section of progressively decreasing cross-sectional area and having a length such as to extend at least to the inner surface of the tube at the wall opening therein. The minimum lateral dimensions of this transition section, at its outer end, are equal to or slightly less than the internal lateral dimensions of the tube to be attached to the larger diameter tube. Outwardly of the tapered transition section, the plug has a lead-in section of substantially constant lateral dimensions.

The plug is anchored in the larger tube either by spot welding its conforming inner end surface of such tube or by mechanical connecting means extending through a smaller opening aligned with the aforementioned wall opening prior to finishing. The end of the smaller tube is telescoped over this lead-in section, which extends through the opening in the larger tube, and then the smaller tube is forced inwardly along the transition surface of the plug. This expands the end of the smaller tube, within the larger tube, to lateral dimensions substantially larger than those of the opening, thus effectively locking the smaller tube into the larger tube.

For an understanding of the invention principles, reference is made to the following description of typical embodiments thereof as illustrated in the accompanying drawings. In the drawings.

In describing the invention, the tube into which the plug is initially positioned will, for convenience, be termed the "main" tube, and the tube joined thereto by the invention plug will be termed the "branch" tubes, these terms being used solely by way of reference. The main tube is always larger than the branch tube.

Figure 1:
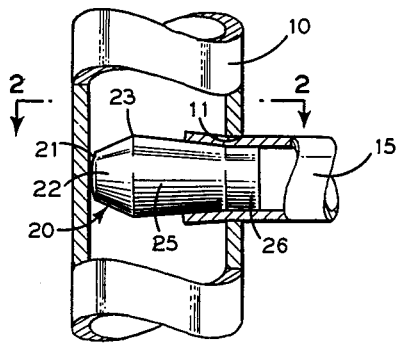
FIG. 1 is an axial sectional view of one form of joint embodying the invention.
Figure 2:
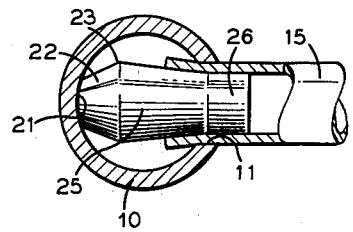
FIG. 2 is a sectional view on the line 2—2 of FIG. 1.

Referring to FIGS. 1 and 2, a circular main tube 10 is illustrated as having a circular branch tube 15 joined thereto by a circular cross-section plug 20. For this purpose, a hole 11 is formed in the wall of main tube 10 and has a diameter substantially equal to the external diameter of branch tube 15.

Plug 20 has an inner end 21 shaped to conformingly engage the inner surface of tube 10 opposite opening 11, and end 21 is spot welded, or otherwise firmly secured to such inner surface. Outwardly of end 21, plug 20 is progressively and relatively sharply, increased in diameter, as at 22 to an intermediate zone 23 substantially equal in diameter to hole or opening 11.

Beginning at zone 23, plug 20 is progressively decreased in diameter to the inner surface of tube 10 at opening 11, where the plug diameter is substantially equal to the inside diameter of branch tube 15. This cross-sectional reduction provides an outwardly tapering transition section 25 between the ends of plug 20. From the outer end of transition section 20, the plug has a constant diameter to form a lead-in section 26 fitting into branch tube 15 and extending substantially through opening 11.

To assemble tube 15 to tube 10, tube 15 is slipped over section 26 and forced inwardly over section 25. This expands the inner end of tube 15, within tube 10, to a diameter larger than opening 11, in which tube 15 fits tightly, thus locking tubes 10 and 15 to each other.

Figure 3:
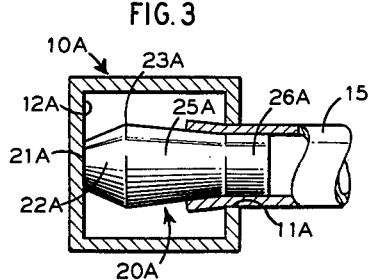
FIGS. 3, 4 and 5 are views similar to FIG. 1 illustrating joints involving various cross-sectional shapes of tubes and plugs.

FIG. 3 shows the assembly of a circular cross-section branch tube 15 to a rectangular cross-section main tube 10A using a circular cross-section plug 20A. In this case, a wall of tube 10A is provided with a round opening 11A of a diameter at least equal to that of part 23A of plug 20A. Plug 20A differs from plug 20 only in that end surface 21A is flat for engagement with flat wall 12A of tube 10A. The assembly technique is the same as in FIGS. 1 and 2.

Figure 4:
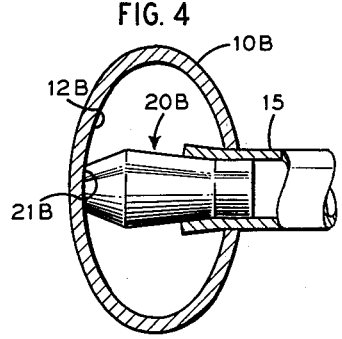

FIG. 4 illustrates circular cross-section branch tube 15 assembled to an elliptical cross-section main tube 10B by a circular cross-section plug 20B. In this case, the end 21B of plug 20B has a flatter curvature than the end 21 of plug 20, for engagement with the relatively flat curved wall 12B of tube 10B. The assembly technique is the same as in FIGS. 1 and 2.

Figure 5:
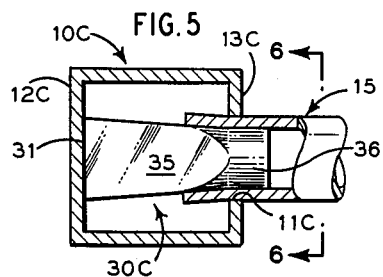
Figure 6:
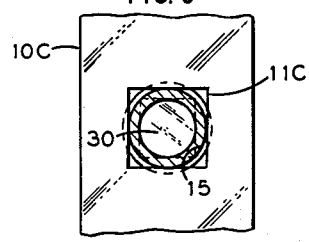
FIG. 6 is a sectional view on the line 6—6 of FIG. 5.

In FIGS. 5 and 6, branch square tube 15 is assembled to a rectangular cross-sectional main tube 10C by a plug 30C. Plug 30C has a rectangular, square, flat inner end 31 having lateral dimensions substantially equal to those of a rectangular (square) hole 11C in wall 13C of tube 10C, and end 31 has surface to surface engagement with wall 12C of tube 10C. Transition section 35 starts at inner face 31 and tapers outwardly to wall 13C, where it merges smoothly with a rectangular (square) cross-section, constant area, lead-in section 36 having a close fit within tube 15. The minimum distance between the outer surface of section 36 and the adjacent edge of hole 11C is substantially equal to the wall thickness of tube 15. Consequently, as tube 15 is expanded within tube 10C by inward movement along surface 35, the outer surface of tube 15 will engage each of the edges of hole 11C.

Figure 8:
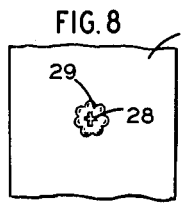
FIG. 8 is an elevation view corresponding to FIG. 7.
Figure 7:
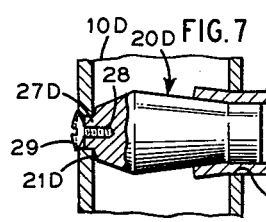
FIG. 7 is a view similar to FIG. 1 illustrating an alternative manner of securing the plug within the larger tube.

In the arrangements so far described, the inner end of the plug is spot welded or mechanically fastened to the inner surface of the main tube prior to any plating or finishing. However, the plug inner end may be mechanically secured to a wall of the main tube, as illustrated in FIGS. 7 and 8. In this embodiment, main tube 10D is formed with a smaller square opening 14D aligned with opening 11D, and surface 21D of plug 20D has a small, tapped square protuberance 27D extending through hole 14D. A screw or stud 28 secures a rosette or washer 29 to the outer end of protuberance 27D to fix plug 20D firmly within tube 10D.

Figure 9:
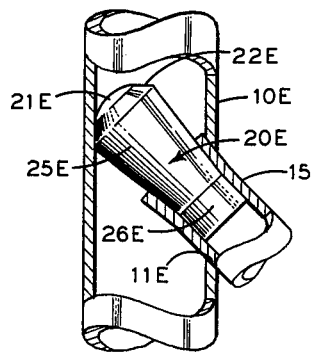
FIG. 9 illustrates a joint between tubes at other than a right angle.

FIG. 9 illustrates branch tube 15 as connected to main tube 10D to extend at an acute angle therefrom. In this case, plug 20E has a short frusto-conical surface 22E engageable with the curved inner surface of tube 10E for spot welding or brazing thereto.

Figure 10:
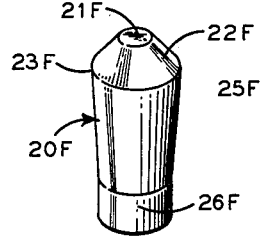
FIGS. 10, 11 and 12 are perspective views of various forms of plugs embodying the invention.
Figure 11:
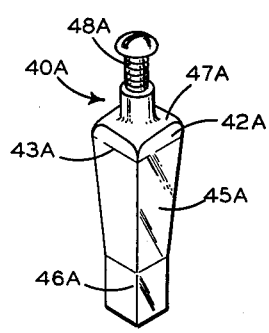
Figure 12:
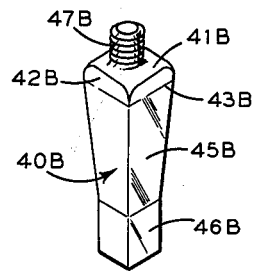

The connection plug may take various forms, as illustrated in FIGS. 10, 11, and 12, and may be either solid or tubular and designed for fixation in the main tube either by spot welding or brazing or by mechanical means. FIG. 10 illustrates a circular cross-section plug 20F which may be either solid or hollow, and comprises a substantially flat weld attachment inner end 21F joined by a frusto-conical section 22F to a branch tube expanding section 25F at a zone 23F. Section 25F merges with a lead-in section 26F. Plug 20F is substantially similar, except for the specific configuration of inner end 21F, to the plugs shown in FIGS. 1 through 4 and 9, and is designed for interconnection of curvilinear cross-section tubes.

FIGS. 11 and 12 illustrate plugs designed to connect a rectangular or square cross-section branch tube to a main tube of curvilinear, rectangular, or square cross-section, with the plugs being mechanically attached in the main tube. The plugs 40A and 40B of these two figures have attachment faces 41A, 41B connected by short sections 42A, 42B to branch tube expanding, tapered sections 45A, 45B at zones 43A, 43B. Constant cross-section lead-in sections 46A, 46B extend outwardly from the tapered, branch tube expanding sections.

Plug 40A has a tapped boss 47A projecting from face 41A to receive a headed attachment bolt 48A. In the embodiment of FIG. 12, a threaded stud 47B extends from face 41B to receive an attachment nut with or without an interposed washer. In each case, the projection 47A or 47B is adapted to extend through a square hole in the main tube.

Figure 13:
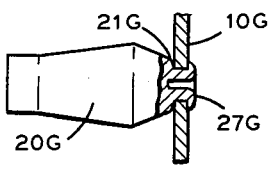
FIG. 13 is a partial sectional view illustrating a "rivet" connection of the plug to the main tube.

In FIG. 13, inner end 21G of plug 20G has a square protuberance 27G extending through a small square hole in main tube 10G and peened over to form a "rivet" connecting plug 20G to the main tube.

In each of the above described arrangements, the plug inner end is firmly and rigidly anchored within the main tube so it cannot turn or twist, and the outer end of the plug has its lateral surface spaced uniformly from the periphery of the wall opening by substantially the wall thickness of the branch tube. Rigid angular relationship and interconnection of the two tubes is maintained permanently by virtue of the rigid anchoring of the plug inner end the expanded end of the branch tube pressed over the plug and the tightly maintained engagement of the branch tube in the wall opening of the main tube.

While specific embodiments of the invention have been shown and described in detail to illustrate the application of the invention principles, it will be understood that the invention may be embodied otherwise without departing from such principles.

What is claimed is:

1. Means for mechanically connecting a branch tube in angular relation to a main tube from an opening in the wall of the latter having dimensions such that its periphery is in contact with the outside wall of the branch tube, said means comprising a relatively elongated plug inserted through such opening and having an inner end shaped for rigid untwistable surface to surface connection with the wall of the main tube opposite such opening; means rigidly connecting said inner end to the wall opposite said opening in surface to surface engagement with said wall; said plug including a lead-in section of substantially constant cross-section extending through such opening, in uniformly spaced relation to the periphery of the opening, for telescoping engagement in the branch tube, and a tube expanding section of said plug extending inwardly from the inner end of said lead-in section and progressively increasing in cross-sectional area from a point at the inner surface of the wall having the opening therein toward the inner end of said plug, to expand, within the main tube and beginning at such point, the inner end of a branch tube telescoped over said lead-in section and moved inwardly through such opening and along said expanding section; the uniform peripheral spacing of the lead-in section and the wall opening being substantially equal to the wall thickness of the branch tube.

2. Connecting means as claimed in claim 1 in which said plug is solid.

3. Connecting means as claimed in claim 1 in which said expanding section has a maximum lateral dimension substantially equal to that of such opening.

4. Connecting means as claimed in claim 3 in which the outer end of said expanding section is tapered toward the inner end of said plug.

5. Connecting means as claimed in claim 1 in which said plug has a curvilinear cross-section and interconnects a pair of curvilinear cross-section tubes.

6. Connecting means as claimed in claim 1 in which said plug has a flat inner end and a curvilinear cross-section to interconnect a curvilinear cross-section branch tube to a rectangular cross-section main tube.

7. Connecting means as claimed in claim 1 in which said plug has a flat inner end and a curvilinear cross-section lead-in section to interconnect a curvilinear cross-section branch tube to a rectangular cross-section main tube.

8. Connecting means as claimed in claim 1 in which said plug inner end is formed for spot welding to a wall of the main tube.

9. Connecting means as claimed in claim 1 in which said plug inner end is formed for mechanical interconnection to a wall of the main tube.

10. Connecting means as claimed in claim 9 in which the plug inner end has a small cross-section protuberance projecting through an aperture in wall of the main tube opposite such opening for mechanical connection to such main tube.

11. Connecting means as claimed in claim 10 in which said protuberance has a tapped opening to receive a bolt or the like.

12. Connecting means as claimed in claim 10 in which said protuberance is threaded to receive a nut.

13. In a tube juncture, the combination which comprises a primary tube member having a round lateral hole of a diameter substantially less than the diameter of said primary tube member adapted for juncture with a secondary tube member; a cylindrical core member disposed in said primary tube member and having its outer end portion in substantially concentric relationship with said hole and having an annular clearance relative to the surrounding edge of said hole, said core member having a length greater than the inside diameter of said primary tube member, said core member having an inner end portion and a frusto-conical portion, said core member having a maximum diameter less than the diameter of said hole whereby said core member may be assembled through said hole, said frusto-conical portion having a length greater than one-half the diameter of said primary tube and with its largest diameter adjacent said inner end portion, the reduced outer end of said frusto-conical portion disposed at said lateral hole and extending outwardly through said lateral hole at least to the plane of the wall of said primary tube in the plane including the axes of said tube members and with said reduced outer end portion so arranged relative to the surrounding edge of the hole that said clearance has a maximum width corresponding to the wall thickness of said secondary tube member at diametrically opposed points in the longitudinal direction of said primary tube member and a minimum width at diametrically opposed points in the direction transversely of said primary tube member; an electric spot weld connection fixing the inner end of said core member rigidly to the wall of said primary member opposite to said hole and rigidly maintaining said concentric relationship between the outer end portion of said core member and said lateral hole, said secondary tube member being adapted to be forced onto said reduced outer end portion of said core member and correspondingly expanded thereby with the tube wall of said secondary member thereby effective to slightly expand said minimum width at respective opposed points of said annular clearance around said core member.

References Cited in the file of this patent

UNITED STATES PATENTS

| | | |
|---|---|---|
| 2,065,902 | Levin | Dec. 29, 1936 |
| 2,112,673 | Lewis | Mar. 29, 1938 |
| 2,575,965 | Malm | Nov. 20, 1951 |
| 2,614,827 | Peach | Oct. 21, 1952 |
| 2,835,513 | Pearson | May 20, 1958 |

FOREIGN PATENTS

| | | |
|---|---|---|
| 826,246 | Germany | Dec. 27, 1951 |